United States Patent
Piasecki et al.

(10) Patent No.: US 9,330,106 B2
(45) Date of Patent: May 3, 2016

(54) SELECTIVE SYNCHRONIZATION OF REMOTELY STORED CONTENT

(71) Applicant: Citrix Systems, Inc., Bedford, MA (US)

(72) Inventors: Derek Piasecki, Santa Barbara, CA (US); Juan Rivera, Miami, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 241 days.

(21) Appl. No.: 13/767,510

(22) Filed: Feb. 14, 2013

(65) Prior Publication Data

US 2013/0212067 A1    Aug. 15, 2013

Related U.S. Application Data

(60) Provisional application No. 61/599,417, filed on Feb. 15, 2012.

(51) Int. Cl.
    *G06F 7/02* (2006.01)
    *G06F 17/30* (2006.01)

(52) U.S. Cl.
    CPC .... *G06F 17/30176* (2013.01); *G06F 17/30575* (2013.01); *G06F 17/30581* (2013.01)

(58) Field of Classification Search
    CPC ................. G06F 17/30575; G06F 17/30581; G06F 3/065; G06F 17/30164
    See application file for complete search history.

(56) References Cited

U.S. PATENT DOCUMENTS

| | | | |
|---|---|---|---|
| 7,320,011 B2 * | 1/2008 | Koskimies | G06F 17/30581 |
| 8,578,076 B2 | 11/2013 | van der Linden et al. | |
| 8,869,235 B2 | 10/2014 | Qureshi et al. | |
| 8,886,925 B2 | 11/2014 | Qureshi et al. | |
| 2002/0052898 A1 * | 5/2002 | Schilit et al. | 707/530 |
| 2003/0233383 A1 * | 12/2003 | Koskimies | 707/204 |
| 2005/0050114 A1 * | 3/2005 | Soinio | 707/204 |
| 2005/0262166 A1 | 11/2005 | Rajeev et al. | |
| 2006/0004847 A1 | 1/2006 | Claudatos et al. | |
| 2009/0083566 A1 * | 3/2009 | Momenee et al. | 713/400 |
| 2011/0173294 A1 * | 7/2011 | Jackson | 709/217 |
| 2013/0054518 A1 * | 2/2013 | Anglin et al. | 707/610 |
| 2013/0332419 A1 * | 12/2013 | Pachipala et al. | 707/626 |

* cited by examiner

*Primary Examiner* — Bruce Moser
(74) *Attorney, Agent, or Firm* — BrainwoodHuang

(57) ABSTRACT

Described herein are methods and systems for selectively synchronizing locally stored data with data stored in a cloud storage repository. A client application can synchronize a portion of the locally or remotely stored content by choosing to synchronize data that is frequently used, data that is marked as priority data or data that was modified or otherwise accessed during a predetermined period of time. Other selective synchronization optimizations include predictively synchronizing data or content associated with frequently use or priority data and synchronizing data according to a priority score.

20 Claims, 8 Drawing Sheets

Fig. 2

SELECTIVE SYNCHRONIZATION OF REMOTELY STORED CONTENT

CROSS REFERENCE TO RELATED APPLICATIONS

This patent application claims the benefit of U.S. Provisional Patent Application No. 61/599,417 filed on Feb. 15, 2012, entitled, "SELECTIVE SYNCHRONIZATION OF REMOTELY STORED CONTENT", the contents and teachings of which are hereby incorporated by reference in their entirety.

FIELD OF THE DISCLOSURE

This disclosure generally relates to synchronizing data stored in multiple physical locations. In particular this disclosure relates to selective synchronization based on characteristics of the synchronized data or the storage locations.

BACKGROUND

Using offsite or remote storage to store data, application content and other digital content is well known. In many instances, offsite storage locations can be configured as a cloud storage location by virtualizing the location and the structure of the offsite storage. Cloud storage repositories can be accessed through various means. For example, a web-based user interface can sometimes be used to access or configure a cloud storage repository. Another example includes using a client application to access, configure and interact with a cloud storage repository.

Although cloud storage repositories are centrally located, client applications used to access data stored in the cloud storage repository may locally store copies of the data. For example, a client application may synchronize at least a portion of the data stored in a cloud storage repository with a local copy of the cloud storage content. The local content can be a recent copy of the data stored in the cloud. From time to time, the client application may synchronize the local content with content stored in the cloud.

Synchronizing content stored in a cloud repository with locally stored content can require a great deal of resources. In particular, transferring and receiving large volumes of data can require a great deal of network resources, e.g. bandwidth, which may slow down the rate at which the local and cloud storage synchronize. Furthermore, end users typically store data and other resources in a cloud storage repository to conserve memory and ensure that their data can be accessed from any machine at any time. Storing a verbatim copy of the cloud storage content on a local disk, or locally storing changes made to the content would frustrate the benefits gained by using an offsite storage location.

SUMMARY

In one aspect, described herein are methods and systems for selectively synchronizing content stored in a cloud storage repository with locally stored content. A client executing on a device can synchronize locally stored and remote stored content based on metrics associated with the content. These metrics can include: a priority score associated with the content; a timestamp indicating when the content was last accessed; a popularity score representative of how many times content is accessed during a predetermined period of time; and a relevancy score determined by how relevant content is to previously identified priority or frequently used content. In some embodiments, the methods and systems can further comprise synchronization optimizations that include synchronizing frequently used and priority data before synchronizing other content.

One embodiment is directed to a method of synchronizing data between a client device (e.g., a user workstation, a general purpose computer, a laptop computer, a tablet, a smart phone, etc.) and a storage repository (e.g., a centralized server farm, a cluster of file servers, distributed storage, cloud storage, etc.). The method includes establishing a communications channel between the client device and the storage repository. The method further includes selecting, from a storage location for files to be synchronized between the client device and the storage repository, a set of files which is related to a particular file based on a set of selection criteria. The method further includes copying, while the communications channel is established, data of the selected set of files between the client device and the storage repository to synchronize the selected set of files between the client device and the storage repository.

The particular file may be manually identified by the user. Alternatively, the particular file may be automatically selected (e.g., the most recently modified file, the most recently accessed file, the file most accessed since the last synchronization event, the file in a specific path or location, etc.). In some arrangements, the method selects a set of files which is related to multiple particular files based on the set of selection criteria.

In some arrangements, a group of files resides within the storage location. In these arrangements, copying the data of the selected set of files between the client device and the storage repository includes transferring the data of the selected set of files between the client device and the storage repository ahead of transferring data of remaining files of the group to synchronize the selected set of files ahead of the remaining files of the group.

In some arrangements, data is uploaded from the client device to the storage repository through the communications channel. In other arrangements, data is downloaded from the storage repository to the client device through the communications channel (e.g., downloading data previously uploaded to the storage repository from another client device). If it is questionable whether the communications channel will be available for the full duration required to transfer all of the files of the group or if bandwidth is limited thus slowing down the transfer process, at least the initial transfer time will be spent on copying the selected set of files between the client device and the storage repository. Furthermore, in the upload context, if there is limited storage available in the storage repository, synchronization of the selected set of files is prioritized ahead of the remaining files of the group.

In some arrangements, selecting the set of files which is related to the particular file includes (i) providing, for each file of the group of files, a respective overall score based on the set of selection criteria, and (ii) distinguishing the selected set of files from the remaining files of the group based on the respective overall score of each file of the group. Each score may be a numeric value, weight, or the like, which identifies a degree of relevancy between a file of the group and the particular file.

In some arrangements, the method includes receiving a set of file relevancy factors as at least part of the set of selection criteria. In these arrangements, each overall score is capable of being an aggregation (e.g., a summation) of multiple individual scores based on the application of the file relevancy factors to each file of the group, i.e., each individual score resulting from application of a specific relevancy factor to a file. In certain arrangements, a predefined threshold determines whether a file belongs to the selected set of files or the remaining files of the group. Such a threshold may be a score threshold (e.g., only files having an overall score higher than the threshold belonging to the selected set of files), a number of files (e.g., the 10 files with the highest overall score belonging to the selected set of files), and so on.

In some arrangements, the overall score for each file is based at least in part on a time difference between a last access timestamp of that file and a last access timestamp of the particular file. Such a feature enables selection of files which have been accessed around the same time as the particular file, e.g., within a predefined time threshold.

In some arrangements, the overall score for each file is based at least in part on a filename similarity between a filename of that file and a filename of the particular file. For example, if the filename of the particular file is "November financials.xls", the selected set of files may include other files having a similar filename format of "<any-month> financials.xls" such as "October financials.xls". As another example, the selected set of files and the particular files may have similar filenames within a predefined string similarity metric or distance function.

In some arrangements, the overall score for each file is based at least in part on content similarity between content of that file and content of the particular file. Such a feature enables selection of files which have content in common with the particular file such as design files containing CAD objects, source code files containing source code, and so on.

In some arrangements, the overall score for each file is based at least in part on a comparison between a file type of that file and a file type of the particular file. Such a feature enables selection of files which have the same or similar file type such as all spreadsheets, all XML files, and so on.

In some arrangements, the overall score for each file is based at least in part on file size similarity between a current file size of that file and a current file size of the particular file. Such a feature enables selection of files which have a file size similar to that of the particular file, e.g., within a predefined size threshold.

In some arrangements, the overall score for each file is based at least in part on access count similarity between an access count of that file and an access count of the particular file. Such a feature enables selection of files which have been accessed, since the last synchronization event, a similar number of times as that of the particular file, e.g., within a predefined access count threshold.

In some arrangements, the overall score for each file is based at least in part on folder location similarity between a current folder within which that file resides and a current folder within which the particular file resides. For example, the selected set of files and the particular files may reside in the same folder, or the selected set of files may reside in a subfolder of the folder that holds the particular file, and so on.

In some arrangements, the overall score for each file is based at least in part on a time difference between a last modification timestamp of that file and a last modification timestamp of the particular file. Such a feature enables selection of files which have been modified around the same time as the particular file, e.g., within a predefined time threshold.

In some arrangements, the overall score is based on the application of a combination of selection criteria. That is, multiple file relevancy factors are applied to generate individual scores for each file. The individual scores for each file are then combined to form the overall score for that file. Accordingly, such operation enables selection of the most relevant files for synchronization based on user behavior (e.g., recent use, frequency of use, file name similarity, file type similarity, file content similarity, common file location, adjacency of modification, and so on).

In some arrangements, the various selection criteria are adjustable. Along these lines, a user may provide a set of user commands to change at least some of the set of selection criteria from original default settings to user defined settings, and later change those user defined settings to new user defined settings, and so on. For example, the client device and the storage repository may initially perform selective synchronization based on original (or default) selection criteria such as similar file size. At a later time, the user may change the original selection criteria to new selection criteria such as same file type. The user may make such a change on the client device and/or the storage repository to enable propagation of the settings changes to other devices.

In some arrangements, the user is provided with a user interface (UI) to navigate among the group of files. Along these lines, the UI may display the filenames of the selected set of files in a sorted list based on the respective overall score of each file of the selected set of files.

Other embodiments are directed to computerized systems and apparatus, control circuitry, computer program products, and so on. Some embodiments are directed to various methods, computerized components and circuits which are involved in synchronizing data between a client device and a storage repository.

It should be understood that, in the cloud context, the storage repository may be formed by remote computer resources distributed over a network. Such a distributed environment is capable of providing certain advantages such as enhanced fault tolerance, load balancing, processing flexibility, high file availability, etc.

BRIEF DESCRIPTION OF THE DRAWINGS

The following figures depict certain illustrative embodiments of the methods and systems described herein, in which like reference numerals refer to like elements. These depicted embodiments are to be understood as illustrative of the disclosed methods and systems and not as limiting in any way.

FIG. 2 depicts an embodiment of a web-based workspace.

DETAILED DESCRIPTION

An improved technique selectively synchronizes data between a client device and a storage repository by (i) selecting a set of files which is related to a particular file based on a set of selection criteria, and (ii) synchronizing data of the selected set of files ahead of other files. Such synchronization may involve evaluation of file aspects such as when files were last used (i.e., accessed or modified), file type, file size, file content, file location, etc. Along these lines, suppose that a group of files resides within a storage location designated to hold files for synchronization. An aggregate score is generated for each file of the group based on application of a set of file relevancy factors. Files of the group are then selected for synchronization ahead of other files of the group based on aggregate score. Accordingly, in situations in which there may be limited opportunity to copy data (e.g., due to sporadic wireless coverage, limited bandwidth, limited capacity available at the storage repository, etc.), the more important data may be copied ahead of less important data.

For example, when attempting to synchronize a group of files, if it is questionable whether the communications channel will be available for the full duration required to synchronize all of the files of the group or if bandwidth is limited thus slowing down the synchronization process, at least the initial upload time will be spent on copying the most important data (as defined by the set of selection criteria) between the client device and the storage repository. As another example, if there is limited storage space available in the storage repository, synchronization of the most important data (as defined by the set of selection criteria) is prioritized ahead of the remaining files of the group.

Figure 1A:
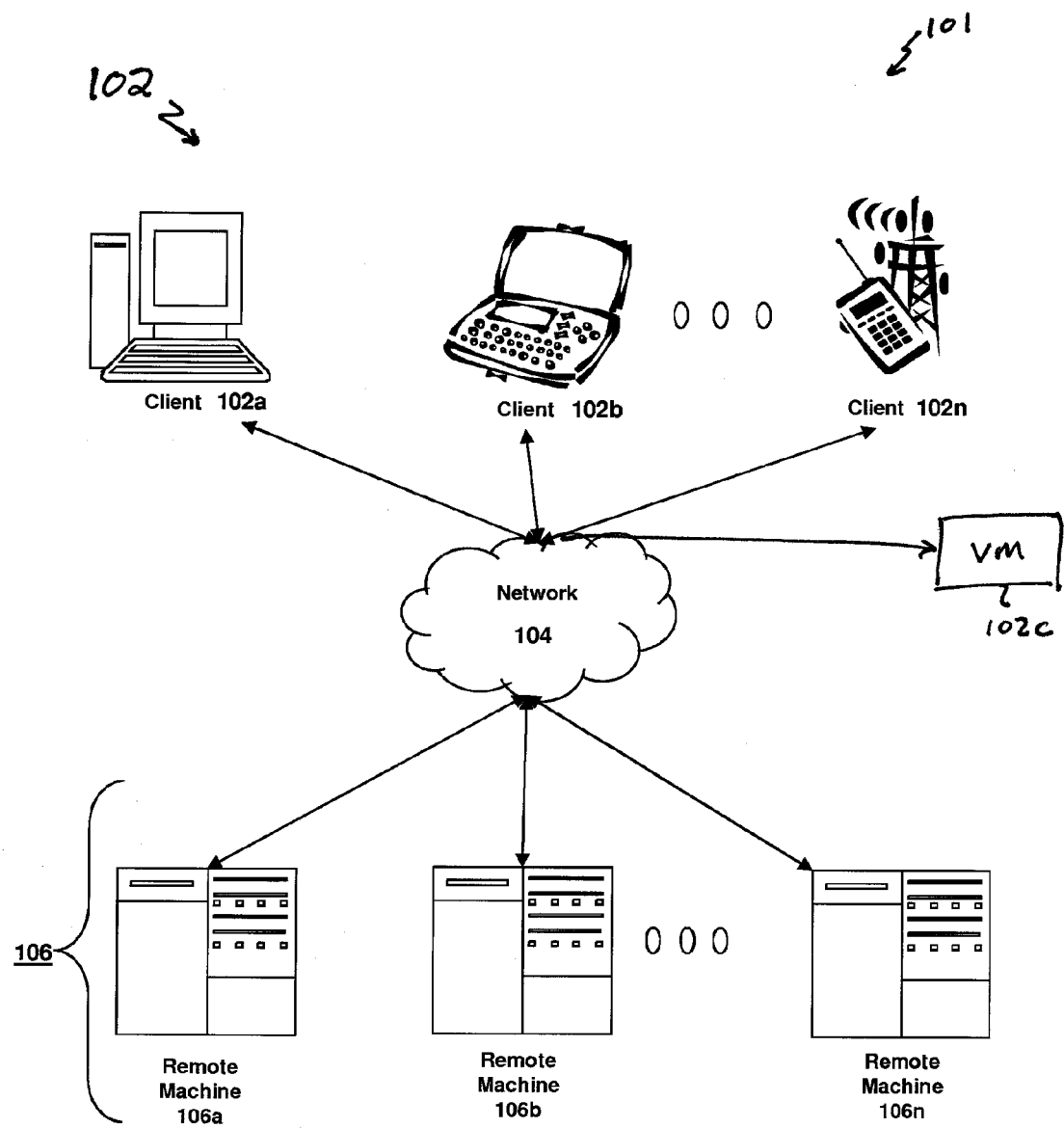
FIG. 1A depicts embodiments of network environments that provide remote access to computing devices that can execute application programs.

FIG. 1A illustrates one embodiment of a computing environment 101 that includes one or more client machines 102A-102N (generally referred to herein as "client machine(s) 102") that communicate with one or more servers 106A-106N (generally referred to herein as "server(s) 106"). Installed in between the client machine(s) 102 and server(s) 106 is a network.

In one embodiment, the computing environment 101 can include an appliance installed between the server(s) 106 and client machine(s) 102. This appliance can mange client/server connections, and in some cases can load balance client connections amongst a plurality of backend servers.

The client machine(s) 102 can in some embodiment be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 can, in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In one embodiment, the client machine 102 can be a virtual machine 102C. The virtual machine 102C can be any virtual machine, while in some embodiments the virtual machine 102C can be any virtual machine managed by a hypervisor developed by XenSolutions, Citrix Systems, IBM, VMware, or any other hypervisor. In other embodiments, the virtual machine 102C can be managed by any hypervisor, while in still other embodiments, the virtual machine 102C can be managed by a hypervisor executing on a server 106 or a hypervisor executing on a client 102.

The client machine 102 can in some embodiments execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 can display the application output in an application window, a browser, or other output window. In one embodiment, the application is a desktop, while in other embodiments the application is an application that generates a desktop.

The server 106, in some embodiments, executes a remote presentation client or other client or program that uses a thin-client or remote-display protocol to capture display output generated by an application executing on a server 106 and transmits the application display output to a remote client 102. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 can be an appliance manufactured by any one of the following manufacturers: the Citrix Application Networking Group; Silver Peak Systems, Inc; Riverbed Technology, Inc.; F5 Networks, Inc.; or Juniper Networks, Inc. Some embodiments include a first server 106A that receives requests from a client machine 102, forwards the request to a second server 106B, and responds to the request generated by the client machine 102 with a response from the second server 106B. The first server 106A can acquire an enumeration of applications available to the client machine 102 and well as address information associated with an application server 106 hosting an application identified within the enumeration of applications. The first server 106A can then present a response to the client's request using a web interface, and communicate directly with the client 102 to provide the client 102 with access to an identified application.

The server 106 can, in some embodiments, execute any one of the following applications: a thin-client application using a thin-client protocol to transmit application display data to a client; a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 102 can, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node can identify and provide address information associated with a server 106 hosting a requested application, to one or more clients 102 or servers 106. In still other embodiments, the master node can be a server farm 106, a client 102, a cluster of client nodes 102, or an appliance.

One or more clients 102 and/or one or more servers 106 can transmit data over a network 104 installed between machines and appliances within the computing environment 101. The network 104 can comprise one or more sub-networks, and can be installed between any combination of the clients 102, servers 106, computing machines and appliances included within the computing environment 101. In some embodiments, the network 104 can be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; or any other protocol able to transmit data among mobile devices.

Figure 1B:
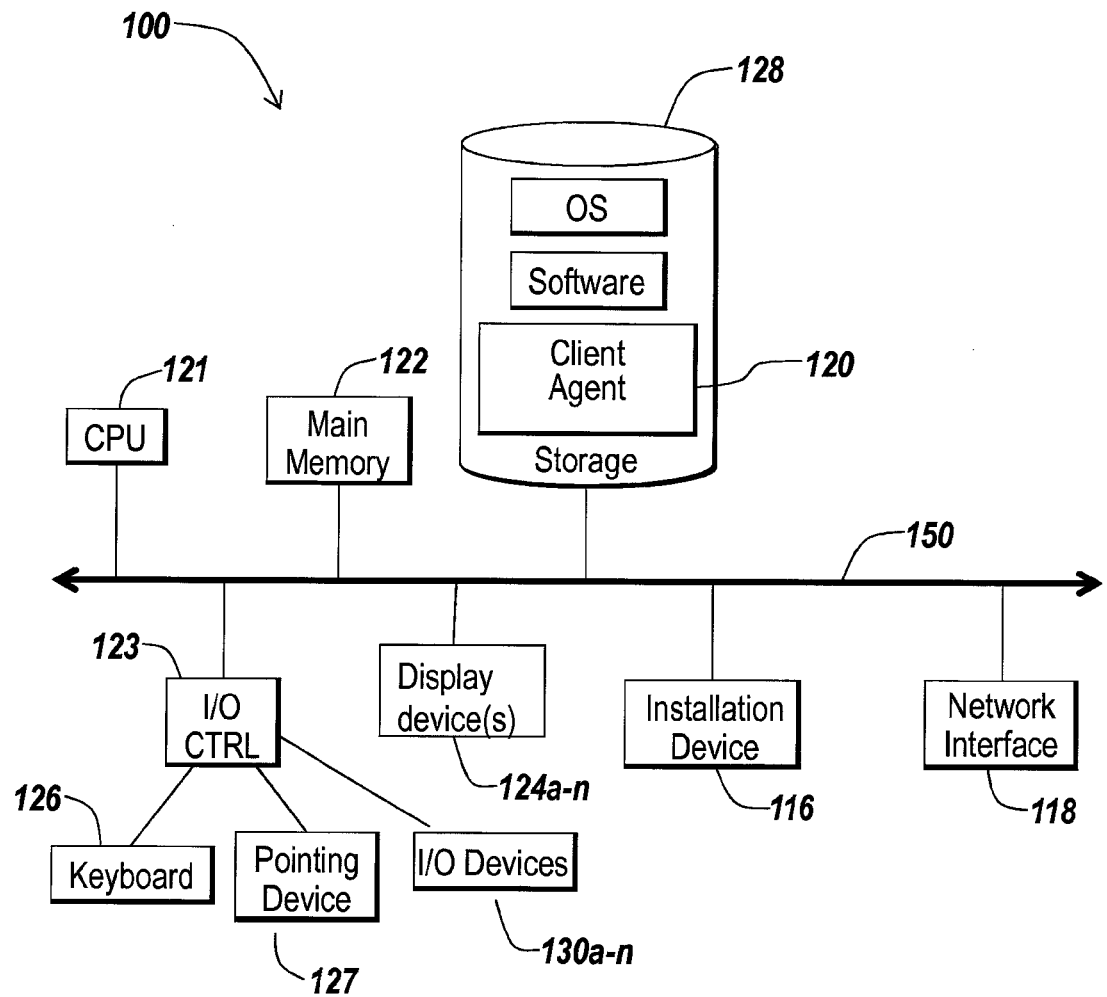
FIG. 1B and FIG. 1C are block diagrams that depict embodiments of computing devices.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

Figure 1C:
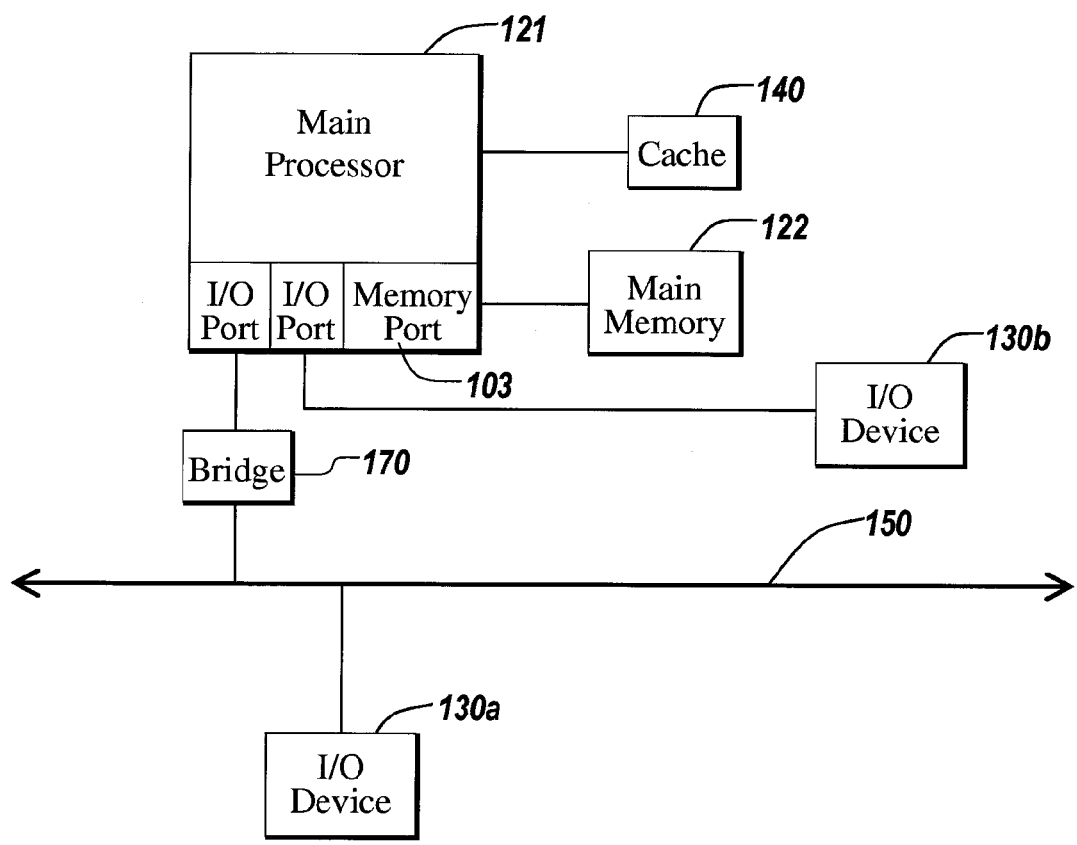

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the main central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 may include any combination of the following: a microprocessor, a microcontroller, a central processing unit with a single processing core, a central processing unit with two processing cores, or a central processing unit with more than one processing core.

While FIG. 1C illustrates a computing device 100 that includes a single central processing unit 121, in some embodiments the computing device 100 can include one or more processing units 121. In these embodiments, the computing device 100 may store and execute firmware or other executable instructions that, when executed, direct the one or more processing units 121 to simultaneously execute instructions or to simultaneously execute instructions on a single piece of data. In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 can include one or more processing cores. For example, the processing unit 121 may have two cores, four cores, eight cores, etc. In one embodiment, the processing unit 121 may comprise one or more parallel processing cores. The processing cores of the processing unit 121, may in some embodiments access available memory as a global address space, or in other embodiments, memory within the computing device 100 can be segmented and assigned to a particular core within the processing unit 121. In one embodiment, the one or more processing cores or processors in the computing device 100 can each access local memory. In still another embodiment, memory within the computing device 100 can be shared amongst one or more processors or processing cores, while other memory can be accessed by particular processors or subsets of processors. In embodiments where the computing device 100 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 100 includes one or more processing units 121, or a processing unit 121 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 100, in some embodiments, can include a graphics processor or a graphics processing unit (Not Shown). The graphics processing unit can include any combination of software and hardware, and can further input graphics data and graphics instructions, render a graphic from the inputted data and instructions, and output the rendered graphic. In some embodiments, the graphics processing unit can be included within the processing unit 121. In other embodiments, the computing device 100 can include one or more processing units 121, where at least one processing unit 121 is dedicated to processing and rendering graphics.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O device 130A-130N. In some embodiments, the local system bus 150 can be any one of the following types of buses: a VESA VL bus; an ISA bus; an EISA bus; a Micro-Channel Architecture (MCA) bus; a PCI bus; a PCI-X bus; a PCI-iExpress bus; or a NuBus. Other embodiments of the computing machine 100 include an I/O device 130A-130N that is a video display 124 that communicates with the central processing unit 121. Still other versions of the computing machine 100 include a processor 121 connected to an I/O device 130A-130N via any one of the following connections: HyperTransport, Rapid I/O, or InfiniBand. Further embodiments of the computing machine 100 include a processor 121 that communicates with one I/O device 130A using a local interconnect bus and a second I/O device 130B using a direct connection.

The computing device 100, in some embodiments, includes a main memory unit 122 and cache memory 140. The cache memory 140 can be any memory type, and in some embodiments can be any one of the following types of memory: SRAM; BSRAM; or EDRAM. Other embodiments include cache memory 140 and a main memory unit 122 that can be any one of the following types of memory: Static random access memory (SRAM), Burst SRAM or Synch-Burst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 121 that can access the main memory 122 via: a system bus 150; a memory port 103; or any other connection, bus or port that allows the processor 121 to access memory 122.

One embodiment of the computing device 100 provides support for any one of the following installation devices 116: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

The computing device 100 may further include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments include an I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SC1/LAMP bus; a FibreChannel bus; or a Serial Attached small computer system interface bus.

In some embodiments, the computing machine 100 can connect to multiple display devices 124A-124N, in other embodiments the computing device 100 can connect to a single display device 124, while in still other embodiments the computing device 100 connects to display devices 124A-124N that are the same type or form of display, or to display devices that are different types or forms. Embodiments of the display devices 124A-124N can be supported and enabled by the following: one or multiple I/O devices 130A-130N; the I/O controller 123; a combination of I/O device(s) 130A-130N and the I/O controller 123; any combination of hardware and software able to support a display device 124A-124N; any type and/or form of video adapter, video card, driver, and/or library to interface, communicate, connect or otherwise use the display devices 124A-124N. The computing device 100 may in some embodiments be configured to use one or multiple display devices 124A-124N, these configurations include: having multiple connectors to interface to multiple display devices 124A-124N; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and executing software on the main computing device 100 and multiple secondary computing devices to enable the main computing device 100 to use a secondary computing device's display as a display device 124A-124N for the main computing device 100. Still other embodiments of the computing device 100 may include multiple display devices 124A-124N provided by multiple secondary computing devices and connected to the main computing device 100 via a network.

In some embodiments, the computing machine 100 can execute any operating system, while in other embodiments the computing machine 100 can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 100 can execute multiple operating systems. For example, the computing machine 100 can execute PARALLELS or another virtualization platform that can execute or manage a virtual machine executing a first operating system, while the computing machine 100 executes a second operating system different from the first operating system.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95c1, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. In still other embodiments, the computing device 100 can be any one of the following mobile computing devices: any one series of Blackberry, or other handheld device manufactured by Research In Motion Limited; the iPhone manufactured by Apple Computer; the iPad manufactured by Apple Computer; Palm Pre; a Pocket PC; a Pocket PC Phone; or any other handheld mobile device.

Figure 2:
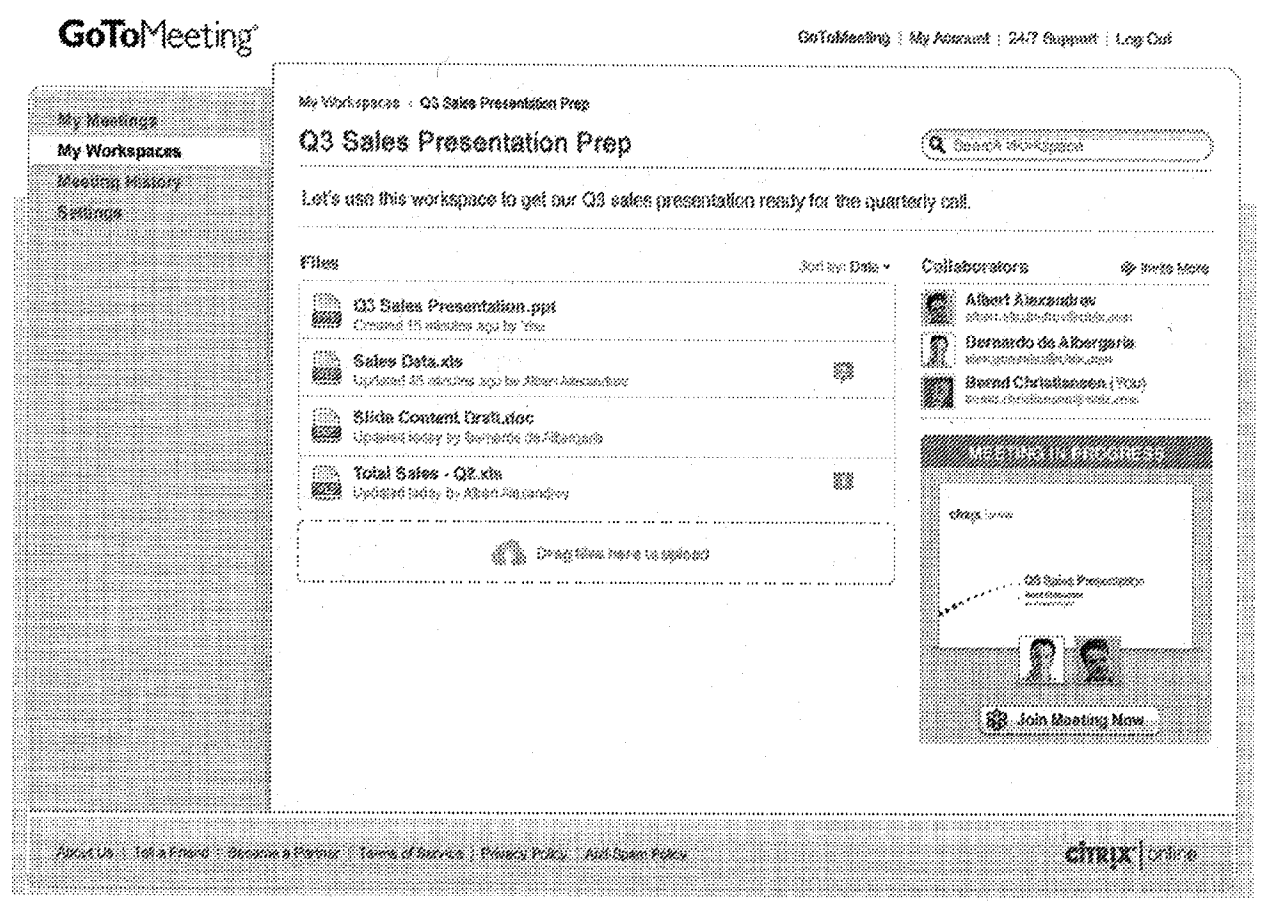

Illustrated is FIG. 2 is a virtual workspace that combines both remote resources and a video or graphical representation of a virtual meeting. The virtual workspace, in some embodiments, can be a website or online content accessed via a browser or similar application. In some instances the virtual workspace can be software delivered as a service through another application such as a browser.

The virtual workspace can in some embodiments display links or graphical representations of remote resources. These resources can sometimes be data or files. In other instances, these resources can be any of the following: desktops, applications, data, files, services, virtual machines, hypervisors, or any other type of electronic resource. Remote resources can be stored on one or more computers or in one or more types of storage repositories. For example, remote resources can be stored on an application server, a data server, an appliance or any other computing device capable of storing and/or executing a resource.

A graphical representation of a remote resource can comprise any number of elements such as: graphic, text, hyperlink or other electronic marking. In some embodiments, the graphical representation can be an active control used to access or execute the remote resource.

The virtual meeting can be represented by a graphical representation of the meeting. This graphical representation can comprise an image of the presentation screen shown during the meeting as well as a list of the meeting attendees. In other embodiments, the graphical representation can include the meeting information (e.g. title, call information, attendees, etc.) and a graphical representation of a shared presentation screen as well as webcam output displayed during the meeting. In still other embodiments, the graphical representation can include a link or control that when selected or activated plays the audio from the meeting.

In other embodiments, the virtual meeting can be represented by a video representation of the meeting. The video representation can display substantially real-time video of the content of the meeting. This content can include the displayed content of a shared presentation screen. The content can further include any of the following: an audio stream of phone and VoIP audio played during the meeting, meeting details, webcam output displayed during the meeting, meeting statistics, or any other information able to be represented through a video display.

In some embodiments, the virtual meetings can be virtual meeting resources and can be represented within the virtual workspace using any combination of video, graphics and text. The representation of the virtual meeting resource within the virtual workspace can provide a user with the ability to either request to join a meeting or join a meeting. Joining a meeting can include entering a virtual meeting such as a meeting held using Citrix GoToMeeting or GoToWebinar, or dropping into a meeting by viewing the video and listening to the audio output from the meeting. Joining a meeting can also include viewing meeting materials associated with a particular meeting including: an agenda, files associated with the meeting, meeting details, a meeting attendee list, or any other meeting materials.

The virtual workspace can comprise any number of virtual resources and any number of graphical or video representations of virtual meetings. In some embodiments, resources and meetings are displayed within a particular user's virtual workspace based on any of the following criteria: a configuration setting managed by the user, whether the user belongs to a particular workgroup, the user has requested to view the meeting, or any other criteria whereby the user is permitted to view the content of a particular meeting.

In one embodiment, the virtual workspace can provide a user interface for accessing and configuring a cloud storage repository 300. The cloud storage repository 300 can be any cloud storage application having any type of backend storage.

Figure 3:
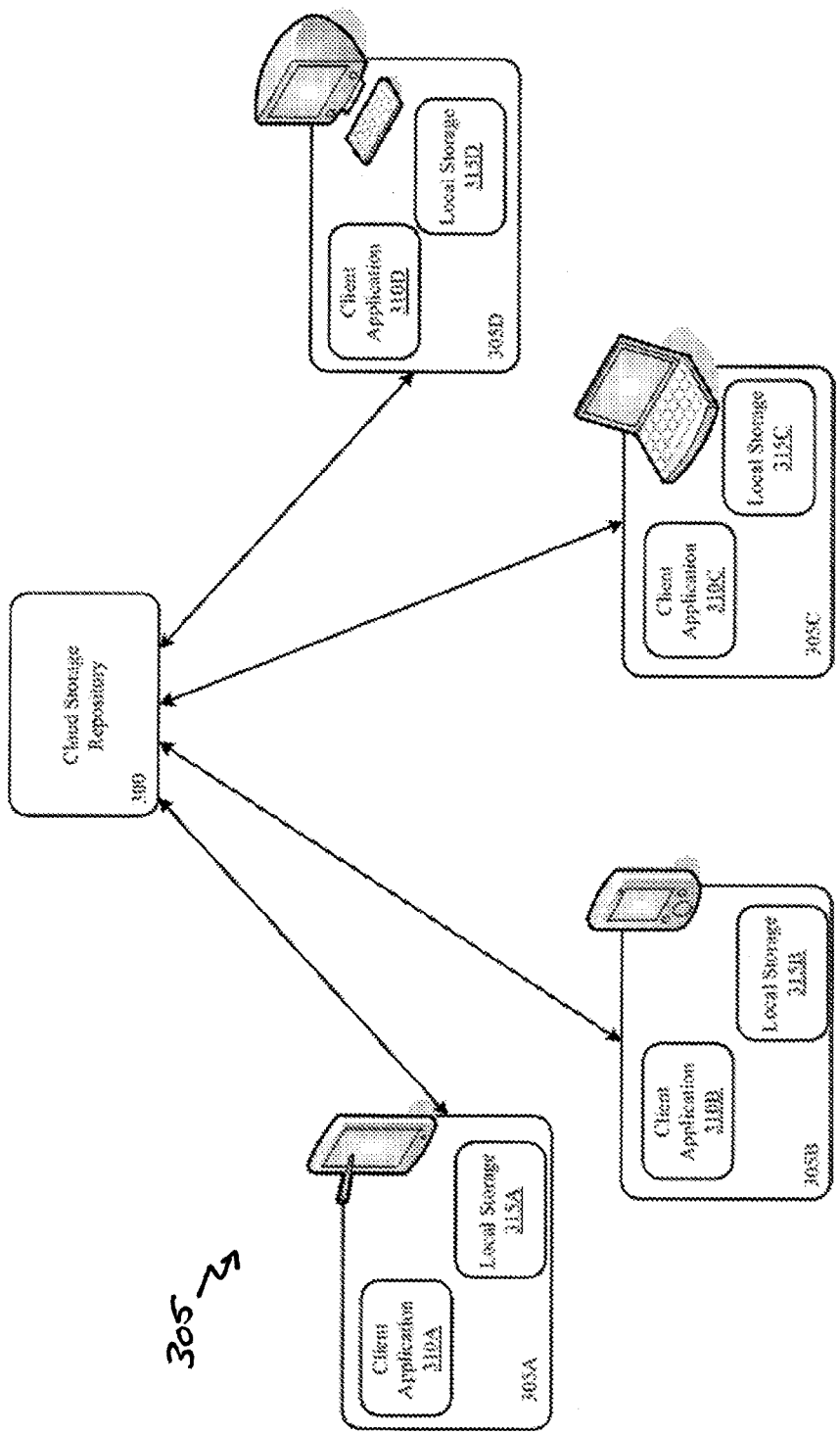
FIG. 3 depicts an embodiment of a cloud storage synchronization environment.

Illustrated in FIG. 3 is an embodiment of a system where a user can access data stored in a cloud storage repository 300 from multiple devices 305A-305D and locations. Each device can comprise at least a client application 310A-310D and a local storage repository 315A-315D.

Further referring to FIG. 3, and in more detail, the system illustrated is an embodiment of a system for accessing data stored in a cloud storage repository 300. The system can comprise any number of elements and at the very least comprises a cloud storage repository 300 that can be accessed by a computing device via a network connection. In some instances, the cloud storage repository 300 can include physical storage embodied within a computer. The physical storage can be memory included within the computer or memory accessible by a cloud storage manager executing on the computer. Access to the physical storage may be provided by a user interface deployed within a website or application, or through a client application executing on a computer remotely located from the physical storage. The cloud storage repository 300 can be a cloud storage repository 300 provided by CITRIX SHAREFILE. In other embodiments, the cloud storage repository 300 can be provided by any of the following applications: DROPBOX, BOX.NET BOX, SUGARSYNC or APPLE ICLOUD.

A cloud storage repository 300 can be accessed by an end user using any type of device 305A-305D (hereinafter "device 305"). A device 305 can be a tablet computer 305A, a smart phone 305B, a laptop 305C, a desktop or server 305D, or any other computing device able to establish a network connection with the cloud storage repository 300 and able to execute a client application or other application in order to access the cloud storage repository 300. Devices 305 may access the cloud storage repository 300 via a connection established over a network such as any network described herein. In some instances, the connection can be a public connection having a minimal amount of security associated therewith. In other instances the connection can be a secure connection.

A user may use any number of devices 305 to access data stored within the cloud storage repository 300. In one embodiment, the user may use multiple devices 305 to substantially simultaneously access the same data stored within the cloud storage repository 300. The cloud storage repository 300 can be configured to restrict the number of devices able to simultaneously access the same data.

Devices 305 can comprise a local storage 315A-315D (hereinafter "local storage 315"). Local storage 315 can comprise any memory described herein and may reside within the device 305 or may reside external to the device. For example, local storage 315 can comprise any of the following: an external hard drive connected to the device 305, a USB storage unit connected to the device 305 or a CD resident within the device 305.

A device 305 may communicate with the cloud storage repository 300 via a client application 310A-310D (hereinafter "client application 310") executing on the device 305. This client application 310 can be an application designed to facilitate storing and accessing data, applications, files and other information stored in the cloud storage repository 300. In some embodiments, a user must provide login or authentication information to the client application 310 in order to access data stored in the cloud storage repository 300. The data accessed by a client application 310 is user-specific such that a particular user must be authorized to access data stored in the cloud storage repository 300. For example, when a user launches a client application 310 on a device 305, the client application 310 obtains an account identifier and transmits the identifier to the cloud storage repository 300. Upon receiving the identifier from the client application 310, the cloud storage repository 300 allows the client application 310 to access data that is associated with the received identifier. At no point can the client application 310 access data stored in the cloud storage repository 300 that is not associated with the received identifier. Data which the client application 310 can access may be referred to as user data.

In some embodiments, the client application 310 can synchronize user data stored in the cloud repository 300 with local storage 315. Synchronizing user data can include copying at least a portion of the user data stored in the cloud repository 300 to local storage 315. Subsequent to synchronization, local storage 315 would store a copy of at least a portion of a user's data stored in the cloud storage repository 300. The data stored in local storage 315 would be accessible when the device 305 is offline.

Synchronization of data between a cloud storage repository 300 and a local storage 315 can occur periodically while the client application 310 accesses the cloud storage repository 300. In some embodiments, synchronization can occur each time data is modified by an application, service or process executing on the device 305. In other embodiments, synchronization can occur each time the client application 310 connects and disconnects to the cloud storage repository 300.

In one instance, a client application 310 can synchronize data stored in a cloud storage repository 300 and locally stored data based on how often data is accessed. When a user accesses data stored in a local storage repository 315 or data stored in a cloud storage repository 300, the client application 310 can tag that data with metadata indicating any of the following: the date and time on which the data was last modified or accessed; a priority ranking based on how many times the data was accessed or modified in a given period of time; a location of the data within a local directory; and/or a listing of associated data.

The client application 310 can use metadata associated with the data to determine what should be synchronized. In one instance, the client application 310 can only synchronize data modified or accessed during a particular time period. For example, the client application 310 can synchronize locally stored content that was modified or accessed while the client application 310 was logged into the cloud storage repository 300. This determination can be made by scanning the metadata of all locally stored content to determine what was modified or accessed during the specified time period. In another instance, the client application 310 can only synchronize frequently used content which can be determined by scanning the metadata of either locally stored content or content stored in the cloud storage repository 300 to determine which files were more frequently accessed during a predetermined period of time.

Further synchronization optimizations can include synchronizing content based on priority or applicability to frequently used content. In some embodiments, the client application 310 may synchronize content based on a priority score associated with data. In other embodiments, the client application 310 may predictively synchronize content based on its applicability to frequently used content. For example, the client application 310 can scan the metadata of locally and/or remotely stored content to search for content that was accessed or modified a predetermined number of times during a predetermine time period, and identify that content as frequently used data. After identifying frequently used data, the client application 310 can further analyze metadata associated with the frequently used data to predictively identify related data. In one instance, the client application 310 can identify related or associated data as any files, data, applications or content stored within the same folder or directory as frequently used data. In another instance, the client application 310 can identify related or associated data by extracting an association list from the metadata of the frequently used data. Once the client application 310 has identified content related to frequently used data, the client application 310 can synchronize not only frequently used data but also any data, files, folders, applications or other content associated with the frequently used data.

Another synchronization optimization can include prioritizing the synchronization process so that content given a higher priority score synchronizes before content having a lower priority score. Prioritizing the order in which files are synchronized can ensure that an end user has real-time access to an up-to-date version of frequently used data, content and data associated with frequently used data and priority files.

Figure 4:
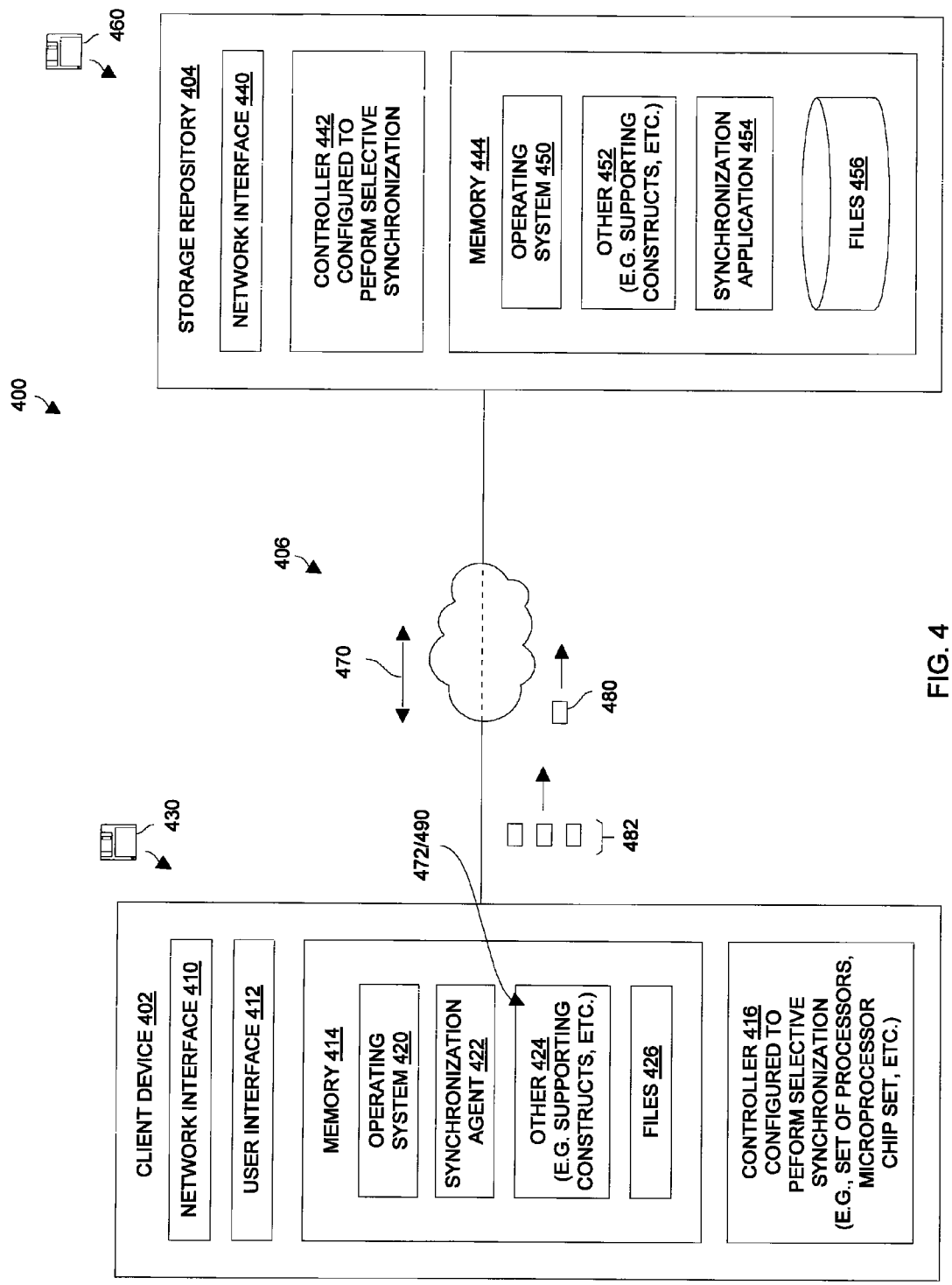
FIG. 4 depicts portions of an electronic environment which are involved in selective synchronization of data.

FIG. 4 shows particular details of a cloud storage synchronization environment 400 which is similar to that of FIG. 3. The environment 400 includes a client device 402 (also see clients 102 in FIG. 1A and devices 305 in FIG. 3), a storage repository 404 (also see cloud storage repository 300 in FIG. 3), and a communications medium 406 (also see network 104 in FIG. 1A).

The client device 402 includes a network interface 410, a user interface 412, memory 414, and a controller 416. The network interface 410 is constructed and arranged to connect the client device 402 to the communications medium 30 for copper-based and/or wireless communications (i.e., IP-based, cellular, etc.). The user interface 412 is constructed and arranged to receive input from a user and provide output to the user (e.g., a standard keyboard, pointing device, and monitor, an integrated touch display, etc.). The memory 414 stores a variety of memory constructs including an operating system 420, a synchronization agent 422, other constructs 424, and files 426. The controller 416 is configured to run in accordance with instructions of the various memory constructs stored in the memory 414.

It should be understood that the controller 416 of the client device 402 may be implemented in a variety of ways including via a set of processors (or cores) or a microprocessing chip set running specialized software, application specific ICs (ASICs), field programmable gate arrays (FPGAs) and associated programs, discrete components, analog circuits, other hardware circuitry, combinations thereof, and so on. In the context of processing circuitry executing software, a computer program product 430 is capable of delivering all or portions of the software to the client device 402. The computer program product 430 has a non-transitory (or non-volatile) computer readable medium which stores a set of instructions which controls one or more operations of the client device 402. Examples of suitable computer readable storage media include tangible articles of manufacture and apparatus which store instructions in a non-volatile manner such as CD-ROM, flash memory, disk memory, tape memory, and the like.

The storage repository 404 includes a network interface 440, a controller 442 and memory 444. The network interface 440 is constructed and arranged to connect the storage repository 404 to the communications medium 30 for copper-based and/or wireless communications (i.e., IP-based, cellular, etc.). The controller 442 is configured to run in accordance with instructions of various memory constructs stored in the memory 444. The memory 444 stores, among other things, an operating system 450, other constructs 452, a synchronization application 454, and files 456.

Again, the controller 442 of the storage repository 404 may be implemented as processing circuitry and/or other hardware in a manner similar to that of the client device 402, but on a larger scale to synchronize data on behalf of multiple users, each having multiple client devices 402. In the context of processing circuitry executing software, a computer program product 460 is capable of delivering all or portions of the software to the storage repository 404. The computer program product 460 has a non-transitory (or non-volatile) computer readable medium which stores a set of instructions which controls one or more operations of the storage repository 404.

The communications medium 406 is constructed and arranged to connect the various components of the environment 400 together to enable these components to exchange electronic signals 460 (e.g., see the double arrow 470). At least a portion of the communications medium 406 is illustrated as a cloud to indicate that the communications medium 406 is capable of having a variety of different topologies including backbone, hub-and-spoke, loop, irregular, combinations thereof, and so on. Along these lines, the communications medium 406 may include copper-based data communications devices and cabling, fiber optic devices and cabling, wireless devices, combinations thereof, and so on.

During operation, the client device 402 performs useful work on behalf of a user. In particular, the controller 416 of the client device 402 under command of the user via the user interface 412 may run particular applications (e.g., see the operating system 420 and other constructs 424) to create, obtain and/or modify certain files 426. Examples of suitable files 426 include, among others, editable text documents, design/development files such as engineering CAD files and source code, audio/video files, virtual disk images, and so on.

Meanwhile, the storage repository 404 performs useful work as well. In particular, the controller 442 of the storage repository 404 under command of another user (e.g., an operator or administrator of the storage repository 404 via a web-based interface) runs particular applications (e.g., see the operating system 450 and the other constructs 452) to provide reliable storage of the files 426 for multiple client devices 402 and the ability to share the files 426 among one or more of the client devices 402 of each user (also see FIG. 3). Along these lines, the memory 444 may be provisioned with a variety of features which may or may not be available locally within each client device 402 such as file recovery/redundancy, file backups/archiving, scalable expansion, and so on.

Also during operation, the controller 416 of the client device 402 detects whether network access is available via the network interface 412 of the client device 402. If network access is available, the controller 416 of the client device 402 (while operating in accordance with the synchronization agent 422) attempts to establish a communications channel with the storage repository 404 through the communications medium 406. As mentioned earlier, access to the storage repository 404 may be intermittent, sporadic, and/or unreliable due to various reasons (e.g., poor wireless network coverage, low bandwidth/competing network traffic, etc.). This aspect is illustrated by the dashed line through the cloud of the communications medium 406.

If the controller 416 of the client device 402 and the controller 442 of the storage repository 404 are able to establish a communications channel through the communications medium 406 to electronically communicate with each other, the controllers 416, 442 operate to selectively synchronize the files 426 in accordance with a set of selection criteria 472, 490. This set of selection criteria 472, 490 may be stored locally in the client device 402 (see the synchronization agent 422 and other constructs 424 in the memory 414 of the client device 402). Also, the set of selection criteria 472, 490 may be stored remotely in the storage repository 404 to remotely save the set of selection criteria 472, 490 as well as to provision the set of selection criteria 472, 490 on other client devices 402 belonging to the same user (see the synchronization application 454 and other constructs 452 in the memory 444 of the storage repository 404).

In accordance with the set of selection criteria 472, 490 the controllers 416, 442 identify a particular file 480 and select a set of files 482 related to the particular file 480 for synchronization. In some arrangements, data of the particular file 480 is synchronized between the client device 402 and the storage repository 404, and such synchronization may be prioritized ahead of other synchronization activity. In other arrangements, data of the particular file 480 is not synchronized between the client device 402 and the storage repository 404.

By way of example and as shown in FIG. 4, the client device 402 uploads the selected set of files 482 (and optionally the particular file 480) to the storage repository 404. In particular, the controller 416 of the client device 402 identifies the particular file 480, and selects the set of files 482 among the group of locally stored files 426 (e.g., files 426 located in a designated storage location such as a folder or under a specified pathname). The controller 416 then copies data of the selected set of files 482 (and optionally the particular file 480) ahead of the other files 426 of the group in order to synchronize the selected set of files 482 ahead of the other files 426 of the group.

It should be understood that such selective synchronization may be performed in the reverse direction as well. In particular, the storage repository 404 is capable of downloading the selected set of files 482 (and optionally the particular file 480) ahead of other files 456 to the client device 402 based on the set of selection criteria 472. That is, the controller 442 of the storage repository 404 identifies the particular file 480, and selects files 482 among the files 456 and copies data of the selected files 482 (perhaps along with the particular file 480) from the storage repository 404 to the client device 402 ahead of the other files 456 of the group in order to synchronize the selected set of files 482 ahead of the other files 456 of the group.

With reference again to the upload situation, it should be understood that the first particular file 480 may be based on a predefined identification criterion 490. This identification criterion 490 is capable of being provided by a user during the course of operation (e.g., via the user interface 412, also see FIG. 2). For example, the client device 402 and the storage repository 404 may initially perform selective synchronization based on original (or default) identification criteria 490. Then, at a later time, the user may change the original identification criteria 490 to new identification criteria 490. The user may make such a change via the client device 402 and/or the storage repository 404.

In some arrangements, this identification criterion 490 is to select, as the particular file 480, the file 426 of the group that was modified (or accessed) most recently (e.g., based on timestamps). That is, the controller 416 running in accordance with the synchronization agent 422 maintains one or more timestamps for each file 426 (e.g., a last access timestamp and a last modified timestamp). At the beginning of synchronization when a connection between the client device 402 and the storage repository 404 is established, the controller 416 of the client device 402 ranks the files 426 based on the timestamps and then identifies the most recently modified (or accessed) file 426 as the particular file 480 in accordance with the ranking results.

In other arrangements, the identification criterion 490 is to select the file 426 of the group that was accessed most often since the last synchronization event, i.e., the controller 416 running in accordance with the synchronization agent 422 maintains a popularity score or count for each file 426 based on how many times that file 426 was accessed (or modified) since the last synchronization event. In this arrangement, at the beginning of synchronization, the controller 416 of the client device 402 selects the file 426 that was accessed (or modified) most as the particular file 480.

In yet other arrangements, the controller 416 of the client device 402 selects the particular file 480 based on a different identification criterion 490 such as a designated file 426 (e.g., based on manual user selection), or based on a location (e.g., a folder or file pathname), or based on a combination of criteria including file aspects such as content type, file type, file size, file location, combinations thereof, and so on. In these arrangements, the controller 416 may generate scores for each file 426 based on one or more of the identification criteria 490 and then select the file 426 with the highest score as the particular file 426 (also see other memory constructs 424 in FIG. 4).

It should be understood that, in some arrangements, the controller 416 identifies more than one particular file 480, i.e., a set of particular files 480, based on the identification criteria 490. Such files 480 may be related in the same manner as described above such as by date modified, date accessed, access count, manual selection of files or location, and so on.

Once the particular file 480 is selected, the controller 416 selects other files 482 to synchronize ahead of the remaining files 426. Again, the controller 416 selects the other files in accordance with the selection criteria 472 which may be provided by the user via the user interface 412.

In one arrangement, the selection criteria 472 is configured to select, as the other files 482, files 426 of the group having timestamps indicating that they were accessed or modified within a particular time window of current time or a timestamp of the particular file 480 (e.g., within 15 minutes, one hour, one day, etc.). In another arrangement, the set of selection criteria 472 is configured to select other files 426 of the group that have file names (or parts of file names) similar to that of the particular file 480 (e.g., within a predefined string similarity metric or distance function, etc.). In yet another arrangement, the set of selection criteria 472 is configured to select other files 426 of the group that contain content similar to that of the particular file 480 (e.g., particular source code, CAD data, etc.). In yet another arrangement, other selection criteria 472 are used (e.g., based on similar content, similar file type, similar file size, same file location, similar access count, similar modification time, combinations thereof, and so on).

With reference back to FIG. 3, one should now appreciate that the controller 416 is able to use the same criteria 472, 490 or similar criteria to enable the user to effectively navigate among the files 426 in the web-based workspace, i.e., a user interface (UI). Along these lines, the UI may display filenames of the selected set of files 482 in a sorted list based on the respective overall score of each file of the selected set of files 482. Furthermore, the user may change the selection criteria to display the files 426 differently, e.g., displaying groups of related files in accordance with the new selection criteria. Further details will now be provided with reference to FIG. 5.

Figure 5:
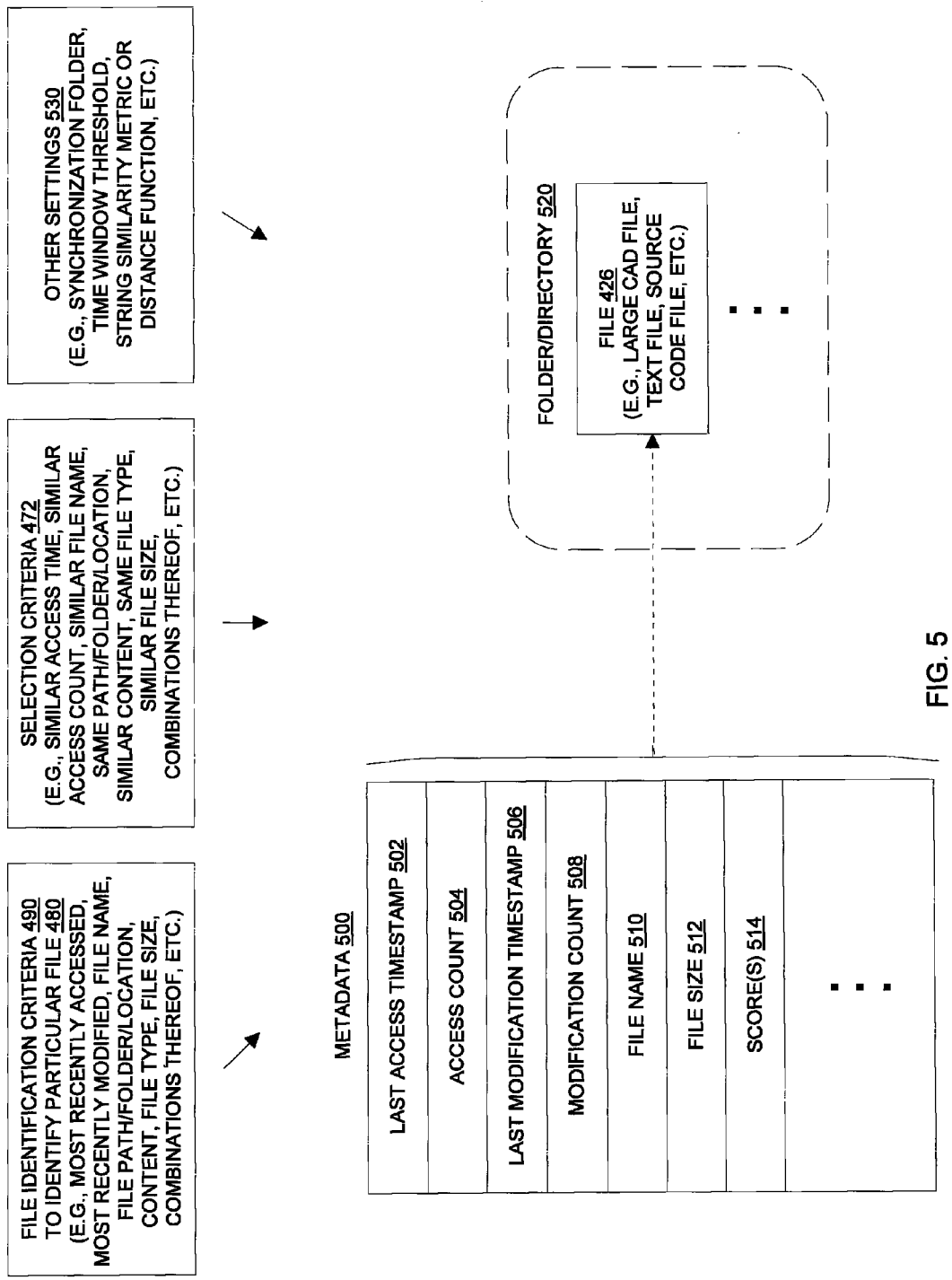
FIG. 5 depicts particular details of the electronic environment of FIG. 4.

FIG. 5 diagrammatically illustrates certain details of a selection operation when evaluating a file 426 for synchronization. By way of example, the selection operation is looking to select files 426 to upload from a client device 402 to the storage repository 404 (also see FIG. 4). Alternatively or in combination, the selection operation may involve selection of files 426 to download from the storage repository 404 to a client device 402.

As shown in FIG. 5, the client device 402 maintains metadata 500 for each file 426. Such metadata 500 may be stored as part of the operating system or file system data of the client device 402 (e.g., in part of the inode structure of each file 426), or separately from the operating system and the file system of the client device 402 (e.g., in a separate location managed by the synchronization agent 422, also see FIG. 4).

The metadata 500 for each file 426 includes a variety of information such as a timestamp 502 of the last access time, an access count 504 (i.e., the number of times the file 426 has been accessed since the last synchronization event), a timestamp 506 of the last modification time, a modification count 508 (i.e., the number of times the file 426 has been modified since the last synchronization event), a file name 510 (e.g., an alphanumeric string), a file size 512, a set of relevancy scores 514 (e.g., a priority score, a relevancy score, etc.), and so on. The client device 402 updates this metadata 500 each time the associated file 426 is somehow accessed (e.g., read from, written to, renamed, moved, and so on).

As further shown in FIG. 5, the particular file 426 described by the metadata 500 in FIG. 5 resides a folder (or directory) 520 perhaps with other files 426. The folder 520 may form part of a file system having a hierarchy (e.g., in the form of an inverted tree).

When the controller 416 of the client device 402 is ready to select the particular file 480 (i.e., the controller 416 running in accordance with the synchronization agent 422), the controller 416 evaluates the metadata 500 and/or other information such as file locations in view of the file identification criteria 490. Recall that, in connection with FIG. 4, the file identification criteria 490 identifies the particular file (or files) 480 (e.g., by modification time, access time, access count, manual selection, filename, path name, etc.

Once the controller 416 has selected the particular file 480, the controller 416 selects a set of related files 482 to synchronize. The controller 416 bases selection of the set of files 482 on the set of selection criteria 472 and perhaps a set of synchronization settings 530 (e.g., which identify how closely the related files 426 must match the particular file 480). As mentioned earlier, this part of the selection operation may involve the application of a combination of selection criteria. Along these lines, the controller 416 applies multiple file relevancy factors to generate individual scores for each file 426 (see the scores 514 in FIG. 5). The individual scores for each file 426 are then combined to form an overall score for that file, i.e., an aggregated score. The controller 416 then selects the files 482 for prioritized synchronization based on the aggregated scores of the files 426. As a result, the controller 416 is able to select the most relevant files for synchronization based on user behavior (e.g., recent use, frequency of use, file name similarity, file type similarity, file content similarity, common file location, adjacency of modification, and so on).

As the controller 416 selects files 482 for synchronization, the controller 416 keeps track of all of the selections. For example, the controller 416 may save the selections on a prioritized list (i.e., an ordered queue), display the selections on the UI (FIG. 3), and so on.

While the selections are being made or after the selections have been made, the controller 416 synchronizes data of the selected set of files 482 (perhaps synchronizing data of the particular file 480 as well based on the settings 530) through the communications channel established between the client device 402 and the storage repository 404 as long as the communications channel remains available. That is, synchronization stops when all of the files 426 including the remaining files 426 that were not selected as having higher priority have been synchronized, the communications channel is lost, or the capacity at the storage repository 426 is reached.

In some arrangements, even if the capacity at the storage repository 426 is reached, the storage repository 426 may allocate a transfer buffer (i.e., additional memory) to allow complete synchronization of all of the files 426 from one client device 402 to the user's other client devices 402 as long as there is sufficient bandwidth available. Further details will now be provided with reference to FIG. 6.

Figure 6:
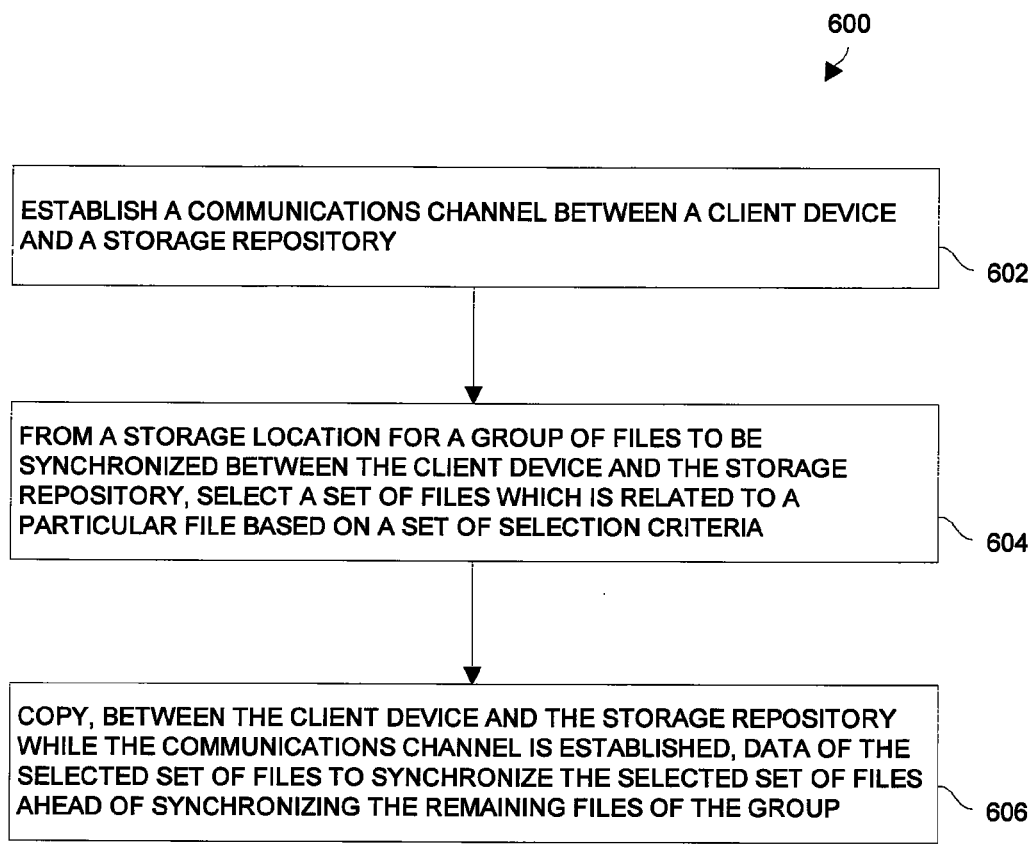
FIG. 6 depicts a flowchart of a procedure which is performed by one or more components of the electronic environment of FIG. 4.

FIG. 6 shows a flowchart of a procedure 600 which is performed by the environment 400 (FIG. 4) to synchronize data between a client device 402 and the storage repository 404. In particular, the procedure 600 is performed by the client device 402, the storage repository 404, or both (e.g., as a system). It should be understood that the storage repository 404 is capable of operating cooperatively with multiple client devices 402 of different users to synchronize data of the different users at the same time based on each users respective selection criteria 472, 490 (FIG. 4).

In step 602, a communications channel is established between the client device 402 and the storage repository 404. For example, a user of a mobile client device 402 may enter a physical location in which the mobile client device 402 detects available wireless computer network coverage. As another example, a computer network component may come on line or recover from a situation of limited bandwidth to provide acceptable network connectivity between the client device 402 and the storage repository 404.

In step 604, a set of files is selected from a storage location for files to be synchronized between the client device 402 and the storage repository 404. Selection of the files 482 from the group of files 426 is based on a particular file 480 and a set of selection criteria 472 which defines how the selected files 482 relate to the particular file 480. Recall that such selection may be based on files 426 with similar access or modification times to that of the particular file 480, similar access count, similar filenames, similar content, and so on.

In step 606, while the communications channel is established, data of the selected set of files 482 is copied between the client device 402 and the storage repository 404 to synchronize the selected set of files 482 between the client device 402 and the storage repository 404. Accordingly, data of the selected set of related files 482 (and perhaps the particular file 480) is synchronized ahead of the remaining files 426 of the group.

As described above, an improved technique selectively synchronizes data between a client device 402 and a storage repository 404 by (i) selecting a set of files 482 which is related to a particular file 480 based on a set of selection criteria 472, and (ii) synchronizing data of the selected set of files 482 ahead of other files. Such synchronization may involve evaluation of file aspects such as when files were last used (i.e., accessed or modified), file type, file size, file content, file location, etc. Along these lines, suppose that a group of files 426 resides within a storage location designated to hold files for synchronization. An aggregate score is generated for each file of the group based on application of a set of file relevancy factors. Files of the group are then selected for synchronization ahead of other files of the group based on aggregate score. Accordingly, in situations in which there may be limited opportunity to copy data (e.g., due to sporadic wireless coverage, limited bandwidth, limited capacity available at the storage repository, etc.), the more important data may be copied ahead of less important data.

While certain exemplary embodiments have been described and shown in the accompanying drawings, it is to be understood that such embodiments are merely illustrative of and not restrictive on the methods and systems described herein. Additionally, it is possible to implement the methods and systems described herein or some of its features in hardware, programmable devices, firmware, software or a combination thereof. The methods and systems described herein or parts of the methods and systems described herein may also be embodied in a processor-readable storage medium or machine-readable medium such as a magnetic (e.g., hard drive, floppy drive), optical (e.g., compact disk, digital versatile disk, etc), or semiconductor storage medium (volatile and non-volatile). Such modifications and enhancements are intended to belong to various embodiments of the disclosure.

What is claimed is:

1. A method of synchronizing data between a client device and a storage repository, the method comprising:
    establishing a communications channel between the client device and the storage repository;
    from a storage location for files to be synchronized between the client device and the storage repository, selecting a set of files which is related to a particular file based on a set of selection criteria; and
    while the communications channel is established, copying data of the selected set of files between the client device and the storage repository to synchronize the selected set of files between the client device and the storage repository;
    wherein a group of files resides within the storage location; and
    wherein copying the data of the selected set of files between the client device and the storage repository includes transferring the data of the selected set of files between the client device and the storage repository ahead of transferring data of remaining files of the group to synchronize the selected set of files ahead of the remaining files of the group;
    wherein selecting the set of files which is related to the particular file includes:
        providing, for each file of the group of files, a respective overall score based on the set of selection criteria, and
        distinguishing the selected set of files from the remaining files of the group based on the respective overall score of each file of the group; and
    wherein providing, for each file of the group of files, the respective overall score based on the set of selection criteria includes:
    generating the overall score for each file based at least in part on a filename similarity between a filename of that file and a filename of the particular file.

2. A method as in claim 1, further comprising:
    prior to selecting the set of files, receiving a set of file relevancy factors as at least part of the set of selection criteria.

3. A method as in claim 2 wherein generating the overall score for each file includes:
    applying each file relevancy factor of the set of file relevancy factors to each file of the group of files to generate a set of relevancy scores for that file, and
    for each file, aggregating the set of relevancy scores for that file to generate an aggregate score as the respective overall score for that file, the selected set of files being distinguished from the remaining files of the group based on the aggregate score generated for each file.

4. A method as in claim 1 wherein
    the overall score for each file is generated based at least in part on a time difference between a last access timestamp of that file and a last access timestamp of the particular file.

5. A method as in claim 1 wherein
    the overall score for each file is generated based at least in part on content similarity between content of that file and content of the particular file.

6. A method as in claim 1 wherein
    the overall score for each file is generated based at least in part on a comparison between a file type of that file and a file type of the particular file.

7. A method as in claim 1 wherein
the overall score for each file is generated based at least in part on file size similarity between a current file size of that file and a current file size of the particular file.

8. A method as in claim 1, further comprising:
prior to selecting the set of files, receiving a set of user commands and, in response to the set of user commands, (i) identifying the particular file among multiple other files and (ii) changing at least some of the set of selection criteria from original default settings to new user defined settings.

9. A method as in claim 1 wherein transferring includes:
uploading the data of the selected set of files from the client device to the storage repository through the communications channel.

10. A method as in claim 1 wherein transferring includes:
downloading the data of the selected set of files from the storage repository to the client device through the communications channel.

11. A method as in claim 1, further comprising:
providing a user interface (UI) to a user, the UI displaying filenames of the selected set of files in a sorted list based on the respective overall score of each file of the selected set of files.

12. A method as in claim 1, further comprising:
prior to selecting the set of files which is related to the particular file based on the set of selection criteria, identifying a file from a file system residing in non-volatile memory of the client device as the particular file; and
wherein transferring includes:
reading the selected set of files from the file system residing in the non-volatile memory of the client device and storing the selected set of files in non-volatile memory of the storage repository, the non-volatile memory of the storage repository being separate and distinct from the non-volatile memory of the client device.

13. A method as in claim 1, further comprising:
prior to selecting the set of files which is related to the particular file based on the set of selection criteria, identifying a file from a file system residing in non-volatile memory of the storage repository as the particular file; and
wherein transferring includes:
reading the selected set of files from the file system residing in the non-volatile memory of the storage repository and storing the selected set of files in non-volatile memory of the client device, the non-volatile memory of the storage repository being separate and distinct from the non-volatile memory of the client device.

14. A method as in claim 1, further comprising:
synchronizing the particular file between the client device and the storage repository.

15. A method as in claim 1, further comprising:
refraining from synchronizing the particular file between the client device and the storage repository.

16. A method of synchronizing data between a client device and a storage repository, the method comprising:
establishing a communications channel between the client device and the storage repository;
from a storage location for files to be synchronized between the client device and the storage repository, selecting a set of files which is related to a particular file based on a set of selection criteria; and
while the communications channel is established, copying data of the selected set of files between the client device and the storage repository to synchronize the selected set of files between the client device and the storage repository;
wherein a group of files resides within the storage location; and
wherein copying the data of the selected set of files between the client device and the storage repository includes transferring the data of the selected set of files between the client device and the storage repository ahead of transferring data of remaining files of the group to synchronize the selected set of files ahead of the remaining files of the group;
wherein selecting the set of files which is related to the particular file includes:
providing, for each file of the group of files, a respective overall score based on the set of selection criteria, and
distinguishing the selected set of files from the remaining files of the group based on the respective overall score of each file of the group; and
wherein providing, for each file of the group of files, the respective overall score based on the set of selection criteria includes:
generating the overall score for each file based at least in part on access count similarity between an access count of that file and an access count of the particular file.

17. A method of synchronizing data between a client device and a storage repository, the method comprising:
establishing a communications channel between the client device and the storage repository;
from a storage location for files to be synchronized between the client device and the storage repository, selecting a set of files which is related to a particular file based on a set of selection criteria; and
while the communications channel is established, copying data of the selected set of files between the client device and the storage repository to synchronize the selected set of files between the client device and the storage repository;
wherein a group of files resides within the storage location; and
wherein copying the data of the selected set of files between the client device and the storage repository includes transferring the data of the selected set of files between the client device and the storage repository ahead of transferring data of remaining files of the group to synchronize the selected set of files ahead of the remaining files of the group;
wherein selecting the set of files which is related to the particular file includes:
providing, for each file of the group of files, a respective overall score based on the set of selection criteria, and
distinguishing the selected set of files from the remaining files of the group based on the respective overall score of each file of the group; and
wherein providing, for each file of the group of files, the respective overall score based on the set of selection criteria includes:
generating the overall score for each file based at least in part on a folder location similarity between a current folder within which that file resides and a current folder within which the particular file resides.

18. A method of synchronizing data between a client device and a storage repository, the method comprising:
establishing a communications channel between the client device and the storage repository;
from a storage location for files to be synchronized between the client device and the storage repository, selecting a set of files which is related to a particular file based on a set of selection criteria; and while the communications channel is established, copying data of the selected set of files between the client device and the storage repository to synchronize the selected set of files between the client device and the storage repository;

wherein a group of files resides within the storage location; and wherein copying the data of the selected set of files between the client device and the storage repository includes transferring the data of the selected set of files between the client device and the storage repository ahead of transferring data of remaining files of the group to synchronize the selected set of files ahead of the remaining files of the group;

wherein selecting the set of files which is related to the particular file includes:

providing, for each file of the group of files, a respective overall score based on the set of selection criteria, and distinguishing the selected set of files from the remaining files of the group based on the respective overall score of each file of the group; and wherein providing, for each file of the group of files, the respective overall score based on the set of selection criteria includes:

generating the overall score for each file based at least in part on a time difference between a last modification timestamp of that file and a last modification timestamp of the particular file.

19. Electronic circuitry, comprising:

memory; and a controller coupled to the memory, the memory storing instructions which, when carried out by the controller, cause the controller to:

establish a communications channel between a client device and a storage repository, from a storage location for files to be synchronized between the client device and the storage repository, select a set of files which is related to a particular file based on a set of selection criteria, and while the communications channel is established, copy data of the selected set of files between the client device and the storage repository to synchronize the selected set of files between the client device and the storage repository;

wherein a group of files resides within the storage location;

wherein the controller, when copying the data of the selected set of files between the client device and the storage repository, is constructed and arranged to transfer the data of the selected set of files between the client device and the storage repository ahead of transferring data of remaining files of the group to synchronize the selected set of files ahead of the remaining files of the group;

wherein the controller, when selecting the set of files which is related to the particular file, is constructed and arranged to:

provide, for each file of the group of files, a respective overall score based on the set of selection criteria, and distinguish the selected set of files from the remaining files of the group based on the respective overall score of each file of the group; and wherein the controller, when providing, for each file of the group of files, the respective overall score based on the set of selection criteria, is constructed and arranged to:

generate the overall score for each file based at least in part on a filename similarity between a filename of that file and a filename of the particular file.

20. A computer program product having a non-transitory computer readable medium which stores a set of instructions to synchronize data between a client device and a storage repository, the set of instructions, when carried out by computerized circuitry, causing the computerized circuitry to perform a method of:

establishing a communications channel between the client device and the storage repository;

from a storage location for files to be synchronized between the client device and the storage repository, selecting a set of files which is related to a particular file based on a set of selection criteria; and while the communications channel is established, copying data of the selected set of files between the client device and the storage repository to synchronize the selected set of files between the client device and the storage repository;

wherein a group of files resides within the storage location;

wherein copying the data of the selected set of files between the client device and the storage repository includes transferring the data of the selected set of files between the client device and the storage repository ahead of transferring data of remaining files of the group to synchronize the selected set of files ahead of the remaining files of the group;

wherein selecting the set of files which is related to the particular file includes:

providing, for each file of the group of files, a respective overall score based on the set of selection criteria, and distinguishing the selected set of files from the remaining files of the group based on the respective overall score of each file of the group; and wherein providing, for each file of the group of files, the respective overall score based on the set of selection criteria includes:

generating the overall score for each file based at least in part on a filename similarity between a filename of that file and a filename of the particular file.

* * * * *